United States Patent [19]
Yamazaki et al.

[11] Patent Number: 5,507,263
[45] Date of Patent: Apr. 16, 1996

[54] COMBUSTION CONTROLLER FOR A SPARK IGNITION TYPE TWO-CYCLE ENGINE

[75] Inventors: Ryutaro Yamazaki; Takaharu Kurosaki; Yuji Tsushima; Kenichi Noda; Yoichi Ishibashi, all of Wako, Japan

[73] Assignee: Honda Giken Kogyo Kabushiki Kaisha, Tokyo, Japan

[21] Appl. No.: 354,855

[22] Filed: Dec. 9, 1994

[30] Foreign Application Priority Data

Dec. 9, 1993 [JP] Japan .................. 5-340387
Dec. 21, 1993 [JP] Japan .................. 5-344705

[51] Int. Cl.$^6$ ........................ F02P 5/14
[52] U.S. Cl. ........................ 123/425
[58] Field of Search ................ 123/425, 323

[56] References Cited

U.S. PATENT DOCUMENTS

| | | | |
|---|---|---|---|
| 5,230,316 | 7/1993 | Ichihara et al. | 123/425 |
| 5,235,951 | 8/1993 | Takasuka et al. | 123/425 |
| 5,268,843 | 12/1993 | Imai | 123/425 |
| 5,287,836 | 2/1994 | Shimasaki et al. | 123/406 |
| 5,383,126 | 1/1995 | Ogawa et al. | 364/431.06 |

*Primary Examiner*—Raymond A. Nelli
*Attorney, Agent, or Firm*—Birch, Stewart, Kolasch & Birch

[57] ABSTRACT

A combustion controller for an internal combustion spark ignition type two-cycle engine includes exhaust passage opening ratio adjusting means for adjusting an exhaust passage opening ratio, wherein the exhaust passage opening ratio adjusting means is driven to adjust the exhaust passage opening ratio at a value corresponding to an engine speed and a throttle valve opening ratio at least in a low load operational area. And fresh mixture in a combustion engine is self-fired with a firing timing desirable for operation of the engine. In this engine, the combustion controller includes ignition timing adjusting means for adjusting an ignition timing; abnormal combustion detecting means for detecting abnormal combustion in the combustion chamber; and control means for controlling the exhaust passage opening ratio. The ignition timing at respective values eliminates the abnormal combustion on the basis of the detection signal from the abnormal combustion detecting means.

5 Claims, 10 Drawing Sheets

COMBUSTION CONTROLLER FOR A SPARK IGNITION TYPE TWO-CYCLE ENGINE

BACKGROUND OF THE INVENTION

1. Field of the Invention

The present invention relates to a combustion controller for a spark ignition type two-cycle engine capable of performing active thermal atmosphere combustion, that is, of self-firing a fresh mixture in a combustion chamber with a firing timing desirable for operation of the engine at least in a low load operational area.

2. Description of the Related Art

A conventional spark ignition type two-cycle engine has a structure wherein an exhaust port and a scavenging port operated/closed by a piston are formed in the inner peripheral surface of a cylinder hole. In this structure, a fresh mixture pre-compressed in a crank chamber is supplied from the scavenging port into a cylinder chamber while burnt gas in the cylinder chamber is exhausted from the exhaust port, and the fresh mixture compressed in the cylinder chamber is fired by an ignition plug.

Such a conventional spark ignition type two-cycle engine is disadvantageous in that when the exhaust port is enlarged to set the output and efficiency in a high speed/high load operational area at higher levels, unburnt hydrocarbon content in the exhaust gas is increased due to the blow-by and instable combustion of the fresh mixture in a low load operational area, resulting in reduced fuel consumption.

To solve this disadvantage, an engine has be en developed by the present inventor, as disclosed in Japanese Patent Application No. 187488/1993, wherein an exhaust control valve is driven to control an exhaust opening ratio at a value corresponding to an engine speed and throttle valve opening ratio, so that at least in a low load operational area, a pressure in a cylinder is suitably controlled upon closure of an exhaust port by a piston and the fresh mixture in a combustion chamber is activated by the thermal energy of the burnt gas remaining in the combustion chamber, thereby making it possible to self-fire the fresh mixture in the combustion engine with the firing timing desirable for operation of the engine.

The active thermal atmosphere combustion performed by the positive control of the firing timing desirable for operation of an engine is referred to as AR (Active Radical) combustion hereinafter.

In the conventional spark ignition type two-cycle engine for performing normal combustion, abnormal combustion mainly occurs at a high temperature and under a high pressure. Accordingly, to cope with this abnormal combustion, there have been adopted measures of increasing the cooling ability of the engine, or of delaying the ignition timing or lowering the position of the exhaust port to reduce the mean effective pressure $P_{mi}$.

In the above-described spark ignition type two-cycle engine disclosed by the present inventor, when abnormal combustion occurs in a normal combustion operational status, there may be adopted the same measures as those in the conventional engine. However, when the ignition timing is delayed or the exhaust opening ratio is reduced in an AR combustion operational area or a transient operational area of the AR combustion operational area and the other combustion operational area as shown in FIG. 9, an inconvenience occurs such that abnormal combustion is increased.

In the spark ignition type two-cycle engine capable of performing AR combustion, as shown in FIG. 10, in a low load operational area in which a throttle opening ratio $\theta_{th}$ is restricted, the fresh mixture in the combustion chamber can be activated by effectively utilizing the thermal energy contained in the burnt gas in the previous cycle and the engine can be operated in the status near the perfect combustion. The output characteristic in this status is higher than that in the normal combustion status accompanied by irregular combustion. As a result, in the case of operating the engine mounted in a vehicle in a high speed/high load operational status, even by greatly restricting the throttle valve opening ratio $\theta_{th}$, the effect of the so-called engine brake due to the abrupt reduction in the output of the engine cannot be sufficiently expected.

SUMMARY OF THE INVENTION

An object of the present invention is to avoid abnormal combustion in the case where an AR combustion engine is operated an AR combustion operational area or in a transient operational area of the AR combustion operational area and a normal combustion operational area.

Another object of the present invention is to provide an AR combustion engine which has a relatively higher output characteristic by the AR combustion in a low load operational area and which can abruptly reduce the output of the engine when a throttle valve is restricted.

To achieve the above object, according to a first aspect of the present invention, there is provided a combustion controller for a spark ignition type two-cycle engine. The engine includes an exhaust passage opening ratio adjusting means for adjusting an exhaust passage opening ratio wherein the exhaust passage opening ratio adjusting means is driven to adjust the exhaust passage opening ratio at a value corresponding to an engine speed and a throttle valve opening ratio at least in a low load operational area. A fresh mixture in a combustion engine is self-fired with a firing timing desirable for operation of the engine. The combustion controller comprises:

ignition timing adjusting means for adjusting an ignition timing;

abnormal combustion detecting means for detecting abnormal combustion in the combustion chamber; and control means for controlling the exhaust passage opening ratio and the ignition timing at respective values suitable for eliminating the abnormal combustion on the basis of the detection signal from the abnormal combustion detecting means.

In the present invention having the above-described construction, when abnormal combustion is detected in an AR combustion operational status, the controlling means is operated on the basis of an abnormal combustion detection signal detected by the abnormal combustion detecting means, so that the exhaust passage opening ratio is increased and the ignition timing is advanced, that is, the exhaust passage opening ratio and the ignition timing are controlled at respective values suitable for eliminating the abnormal combustion, thus automatically avoiding the abnormal combustion.

Although the measures for abnormal combustion are different both in the normal combustion operational area and AR combustion operational area, according to the present invention, the abnormal combustion can be automatically avoided without any judgment by an operator, thus preventing the gene ration of damage to the engine and abnormal combustion noise.

According to a second aspect of the present invention, there is provided a combustion controller for a spark ignition type two-cycle engine capable of self-firing a fresh mixture in a combustion chamber at least in a low load operational area. The combustion controller comprises:

exhaust passage opening ratio adjusting means for adjusting an exhaust passage opening ratio for controlling a compression start pressure in a cylinder; and controlling means for driving the exhaust passage opening ratio adjusting means and adjusting the exhaust passage opening ratio at a value at least corresponding to an engine speed and a throttle valve opening ratio, thereby controlling the compression start pressure in a cylinder to be a target value capable of self-firing a fresh mixture in the combustion chamber with a timing desirable for operation of the engine;

wherein the exhaust passage opening ratio in the width of the throttle valve opening ratio ranging from the minimum value to a specified value is set to be larger than the exhaust passage opening ratio at the throttle valve opening ratio near the minimum throttle valve opening ratio.

In the present invention having the above-described construction, when the throttle valve is restricted in the state where the throttle valve opening ratio is large, the exhaust passage opening ratio adjusting means is operated by control of the controlling means so that the exhaust passage opening ratio is enlarged at the minimum throttle valve opening ratio. The AR combustion operational status where the fresh mixture in the combustion chamber is self-fired with a firing timing desirable for operation of the engine is switched into the normal combustion operational status.

In this way, according to the present invention, when an operator (driver in the case where the engine is mounted on a vehicle) operates the throttle valve in such a manner as to restrict the throttle valve opening ratio, the AR combustion operational status having a high output characteristic can be switched into a normal combustion operational status having a low output characteristic, so that it becomes possible to significantly reduce the output of the engine and hence to abruptly decelerate the engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
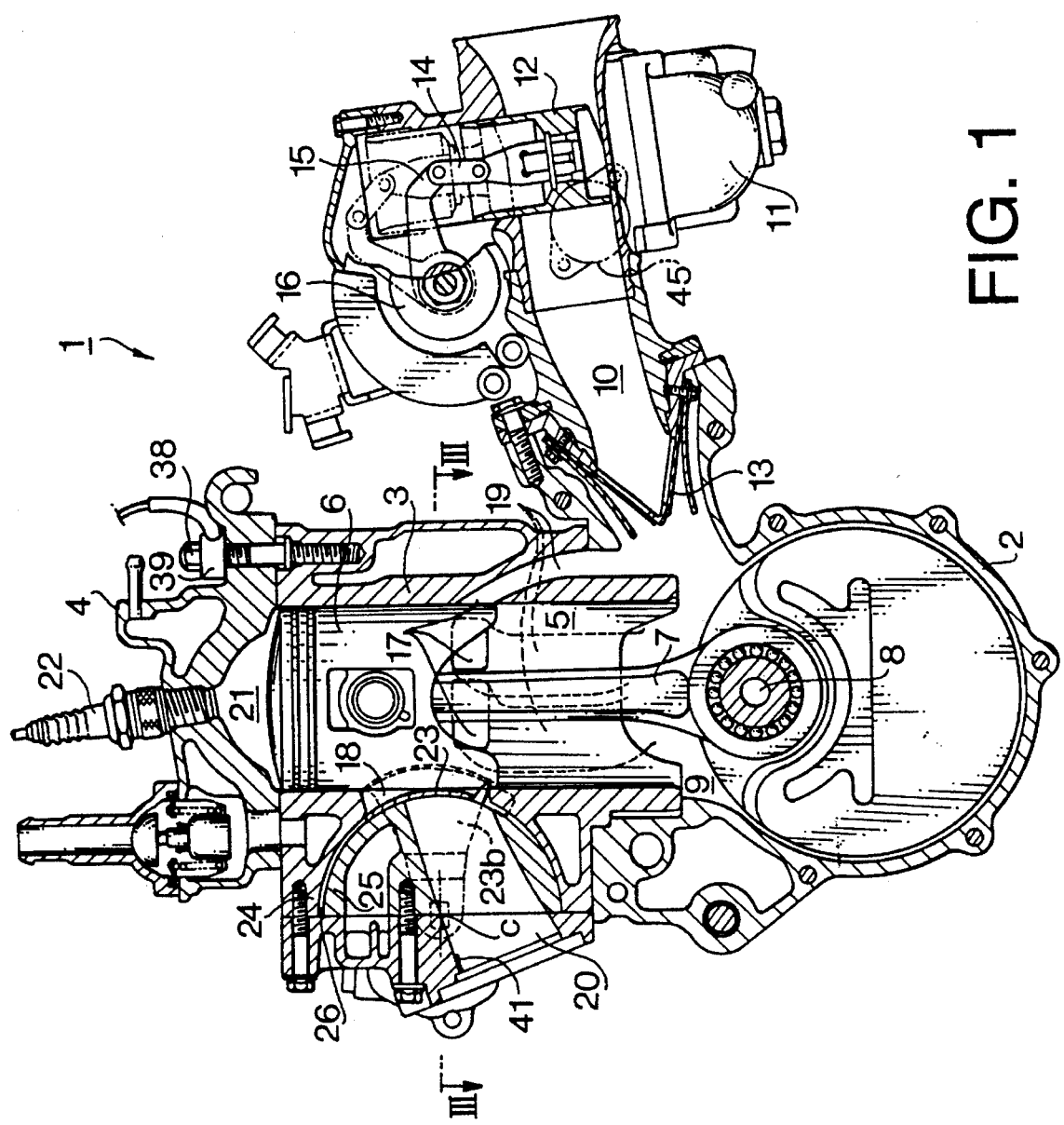
FIG. 1 is a vertical sectional view of a cylinder portion of a spark ignition type two-cycle engine having a combustion controller according to an embodiment of the present invention.

Hereinafter, one embodiment of the present invention will be described with reference to FIGS. 1 to 4.

A spark ignition type two-cycle engine 1 having a throttle valve controller of the present invention is adapted to be mounted on a motorcycle (not shown). In this engine 1, a cylinder block 3 and a cylinder head 4 are sequentially overlapped over a crank case 2, to be thus integrally connected to each other.

A piston 6 is fitted in a cylinder hole 5 formed in the cylinder block 3 in such a manner as to be slidably moved up and down. The piston 6 is connected to a crank 8 by means of a connecting rod 7 such that the crank 8 is rotated by the upward and downward movement of the piston 6.

An intake passage 10 is connected to a crank chamber 9 in the crank case 2. A carburetor 11 and a reed valve 13, which are connected in series to each other, are interposed in the intake passage 10. A piston type throttle valve 12 in the carburetor 11 is connected to a throttle drum 16 by way of a rod 14 and a lever 15. The throttle drum 16 is connected to a throttle grip by way of a wire (not shown) such that the throttle valve 12 can be moved upward for increasing the opening ratio thereof by twisting of the throttle grip in one direction.

The intake passage 10 is connected to the crank chamber 9 in the crank case 2. A scavenging port 17 and an exhaust port 18 are opened in the inner peripheral surface of the cylinder hole 5. The scavenging port 17 is communicated to the crank chamber 9 by way of a scavenging passage 19, while the exhaust port 18 is communicated to an exhaust passage 20.

An ignition plug 22 is provided in a recess formed in a combustion chamber 21. A fresh mixture mixed with a fuel supplied from the carburetor 11 is sucked in the crank chamber 9 under a negative pressure upon up-stroke by way of the reed valve 13. The fresh mixture is compressed upon down-stroke, and is supplied in the combustion chamber 21 when the piston 6 is moved downward from the position of the scavenging port 17 and thus the scavenging port 17 is opened. With this advance of the compressed fresh mixture, part of the burnt gas in the combustion chamber 21 is exhausted from the exhaust port 18 into the exhaust passage 20. As the scavenging port 17 and the exhaust port 18 are sequentially closed by the upward movement of the piston 6, the mixed gas in the combustion chamber 21 is compressed by the upward movement of the piston 6. Thus, in the vicinity of the top dead center, the mixture gas is fired by the ignition plug 22 or self-fired by the thermal energy of the residual gas in the previous cycle.

Figure 2:
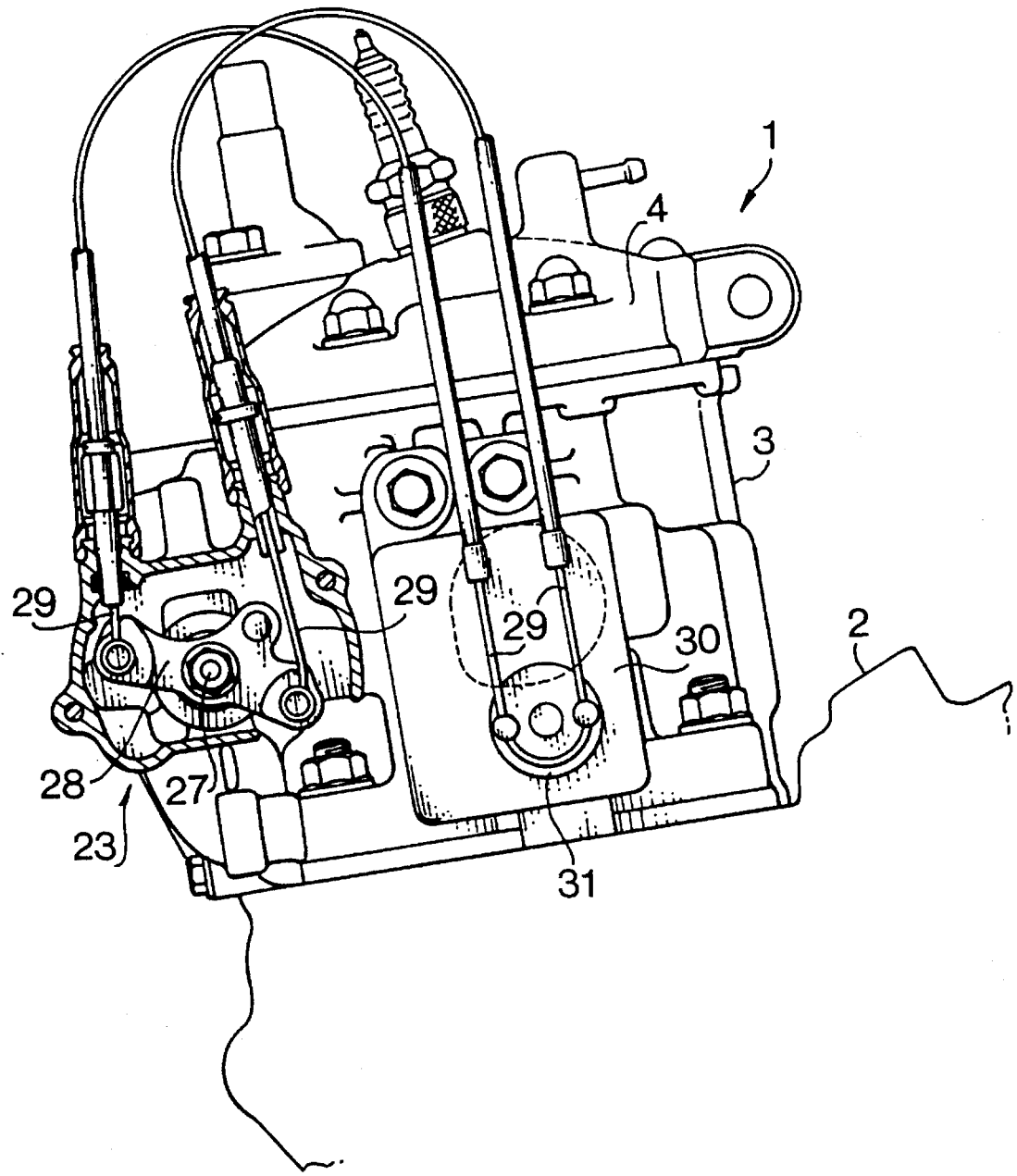
FIG. 2 is a side view of the cylinder portion as seen from the same side as shown in FIG. 1.
Figure 3:
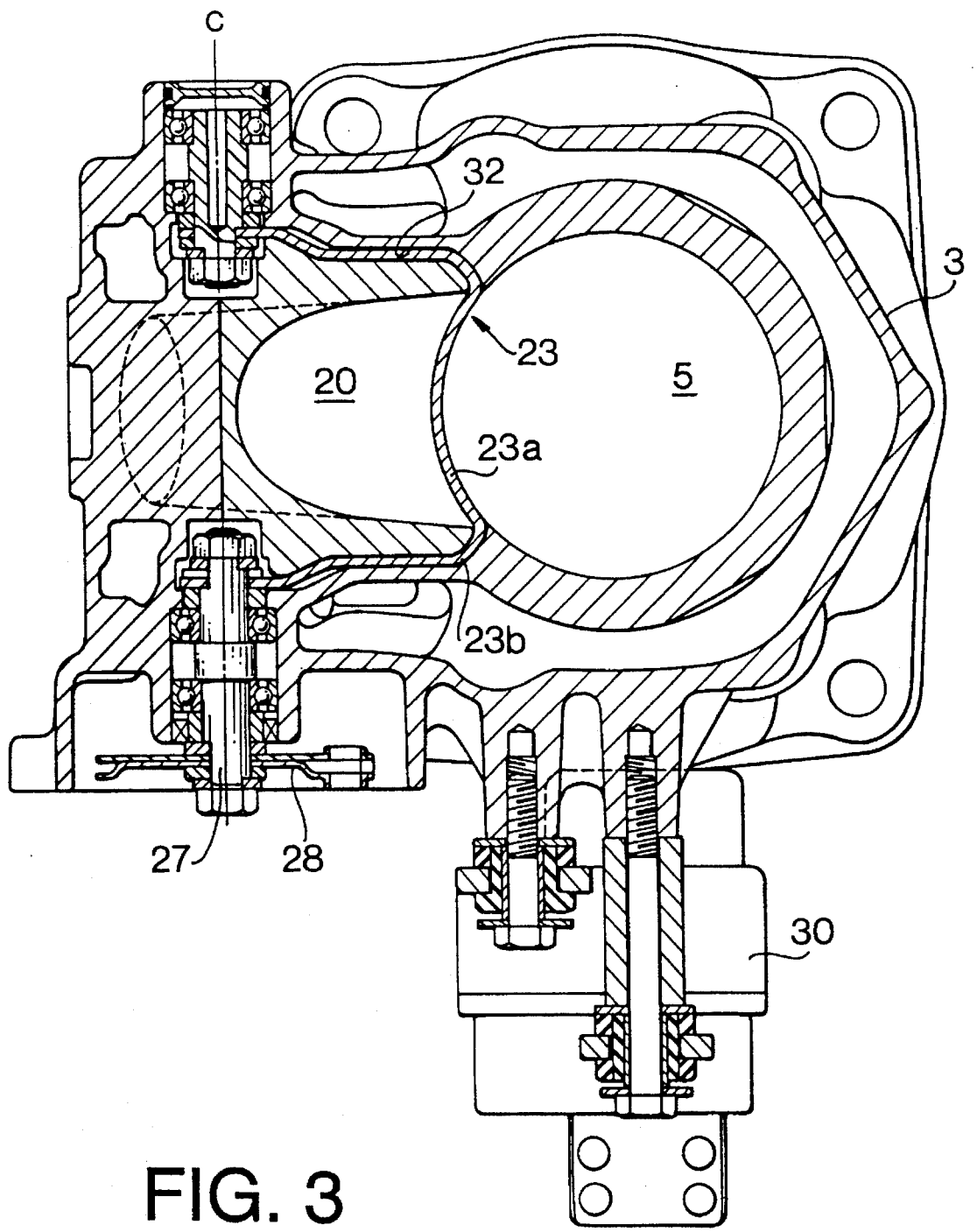
FIG. 3 is a transverse sectional plan view taken along line III—III of FIG. 1.

An exhaust control valve 23 is provided near the exhaust port 18 in such a manner as to be fitted in a gap 26. The gap 26 has substantially the same interval as that of the valve 23, and is positioned between a recess 24 having an arcuate shape in vertical cross-section and provided in the cylinder block 3, and an exhaust passage member 25 formed substantially in the same shape as that of the recess 24 in vertical cross-section. The exhaust control valve 23 is pivotably supported around the center line "c" in the gap 26 so as to be vertically rockable. A drive lever 28 shown in FIG. 2 is integrally mounted on a drive shaft 27 integrated with the exhaust control valve 23. The drive lever 28 is connected to a pulley 31 of an exhaust control servo-motor 30 by way of a drive cable 29. The exhaust control valve 23 is vertically rocked by the exhaust control servo-motor 30, and is set at a desired exhaust opening ratio $\theta_e$ between 0 and 100%.

The exhaust control valve 23 is formed in a U-shape in horizontally transverse section, and a side arm portion 23b thereof is fitted in a gap portion 32 positioned outward from the exhaust passage 20. Thus, the side arm portion 23b, excluding an arcuate portion 23a of the exhaust control valve 23 for closing the exhaust port 18, does not exert any adverse effect on the flow of the exhaust gas.

Figure 4:
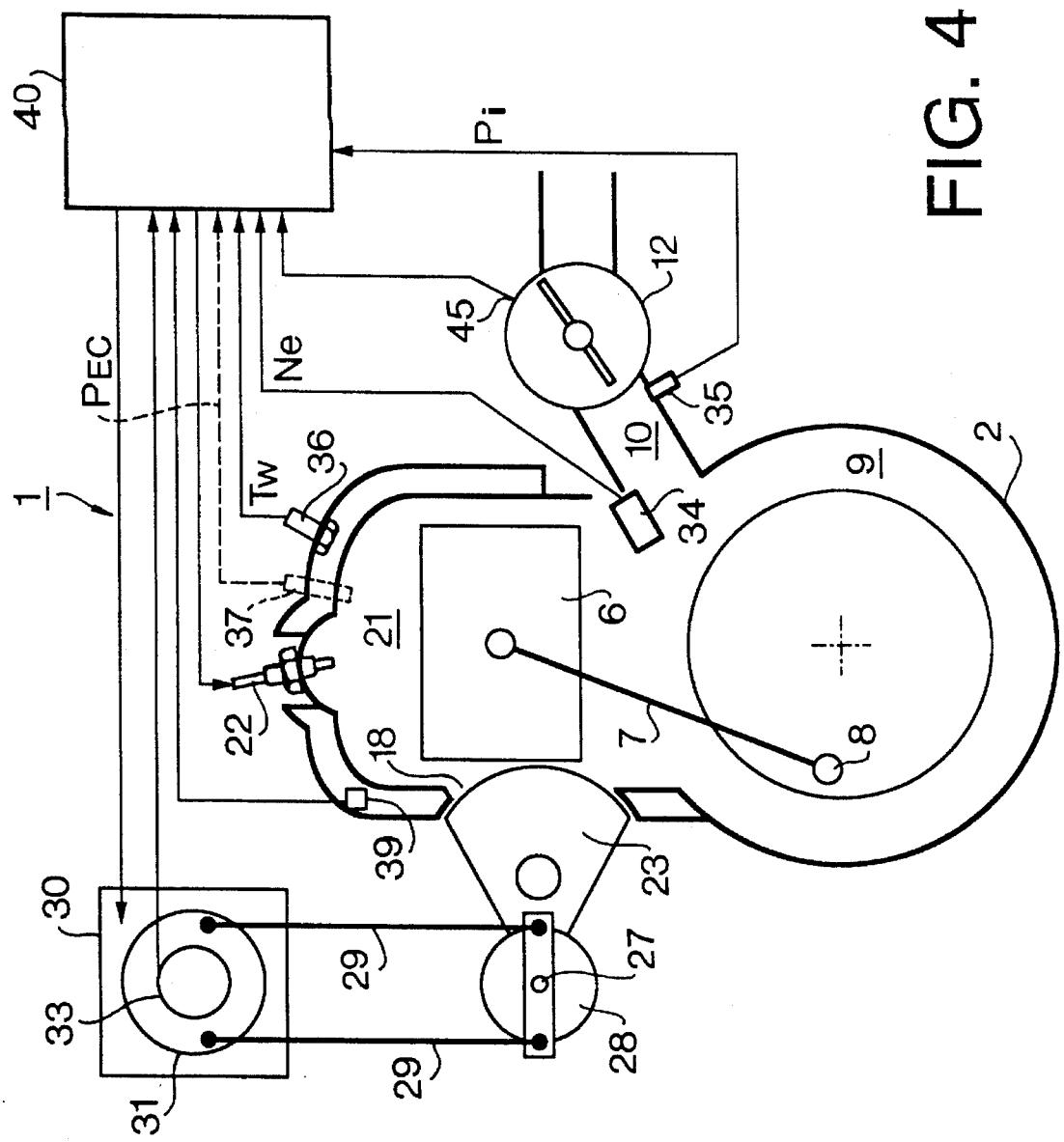
FIG. 4 is a schematic view of the embodiment shown in FIG. 1.

FIG. 4 is a schematic view of an essential portion of the spark ignition type two-cycle engine 1. In this figure, the throttle valve opening ratio $\theta_{th}$ of the throttle valve 12 manually operated is detected by a throttle valve opening sensor 45 composed of a potentiometer or the like, and it is input in a CPU 40.

An engine speed $N_e$ detected by an engine speed sensor 34; an intake pressure $P_i$ detected by an intake pressure sensor 35; a cooling water temperature $T_W$ detected by a water temperature gauge 36; an indicator maximum pressure generating timing, firing timing or compression start pressure $P_{EC}$ detected by an indicator or optical sensor 37; switching of a clutch; and the gear-shift position of a transmission are also input in the CPU 40.

A load cell 39 is additionally provided on a connecting bolt 38 for integrally connecting the cylinder head 4 to the cylinder block 3. The load of the connecting bolt 38 withstanding the force of the cylinder header 4 intended to be separated from the cylinder block 3 by the pressure within the combustion chamber 21 is detected by the load cell 39. In the case where abnormal combustion occurs in the combustion chamber 21, it is detected by the load cell 39 and is transmitted to the CPU 40.

The CPU 40 judges the operational status of the spark ignition type two-cycle engine 1 on the basis of the above-described input values, and it transmits various control signals. In this case, the CPU 40 operates in accordance with an exhaust opening control map of FIG. 6 which determines the exhaust opening ratio $\theta_e$ depending on the engine speed $N_e$ and the throttle valve opening ratio $\theta_{th}$, and an ignition timing control map of FIG. 7 which determines an ignition timing $\theta_{ig}$ of the ignition plug 22 depending on the engine speed $N_e$ and the throttle valve opening ratio $\theta_{th}$. The CPU 40 transmits a drive signal $\Delta\theta_e$ to the exhaust control servo-motor 30 to set the exhaust opening ratio $\theta_e$ obtained by the exhaust opening control map, and at the same time allows the ignition plug 22 to be ignited with the ignition timing $\theta_{ig}$ obtained by the ignition timing control map.

Figure 6:
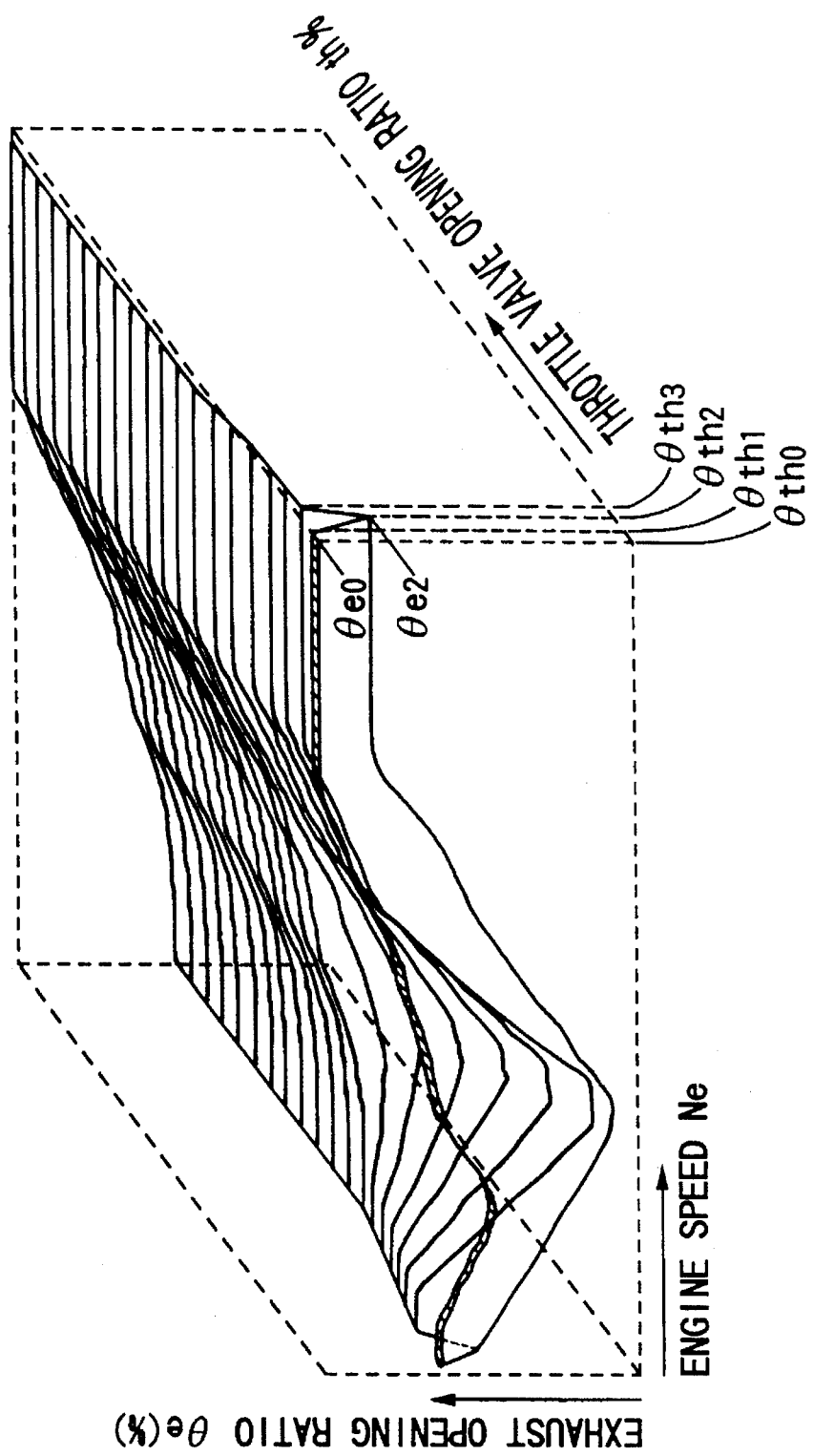
FIG. 6 is a diagram showing an exhaust opening control map.
Figure 7:
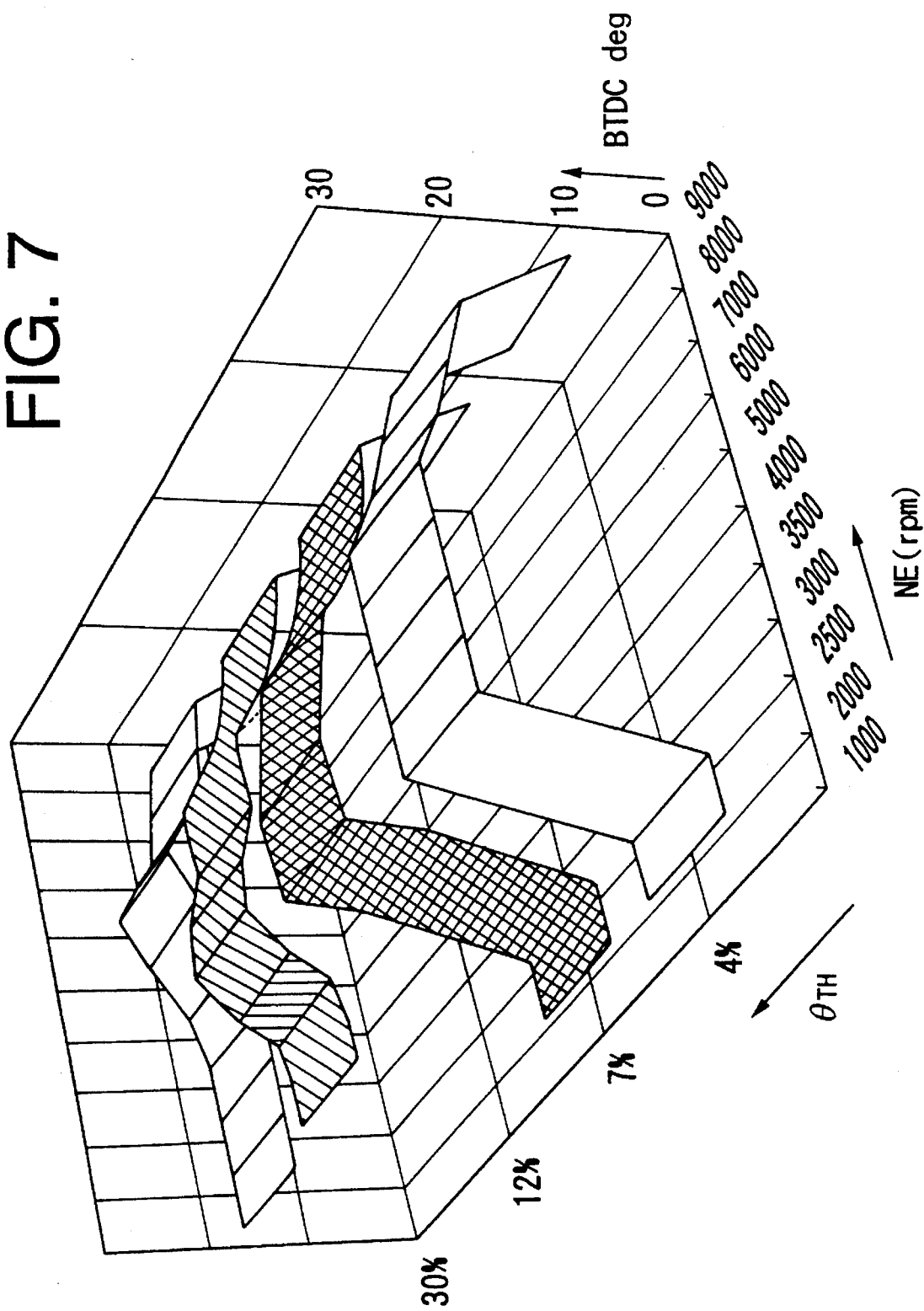
FIG. 7 is a diagram showing an ignition timing control map.

The exhaust opening ratio $\theta_e$ in the exhaust opening control map in FIG. 6 is determined such that the gas filled in the cylinder is self-fired with a timing most desirable for operation of the spark ignition type two-cycle engine 1.

In the map 6, an exhaust passage opening ratio $\theta_{e0}$ between the minimum throttle valve opening ratio $\theta_{th0}$ and an opening ratio $\theta_{th1}$ slightly larger than the minimum throttle opening ratio $\theta_{th0}$, is set to be larger than an exhaust passage opening ratio $\theta_{e2}$ of a throttle valve opening ratio $\theta_{th2}$ larger than the opening ratio $\theta_{th1}$.

In the case where the load cell 39 detects the generation of abnormal combustion; in the normal combustion operational area, the CPU 40 reduces the exhaust opening ratio $\theta_e$ by the positive correction and at the same time it delays the ignition timing $\theta_{ig}$; and in the AR combustion operational area or the transient operational area of the AR combustion operational area and the other combustion operational area, the CPU 40 increases the exhaust opening ratio $\theta_e$ by the negative correction and at the same time it advances the ignition timing $\theta_{ig}$.

According to the embodiment shown in FIGS. 1 to 4 having the above-described construction, in an operational area in which the engine speed $N_e$ is large, the exhaust control valve 23 is rocked upward and is substantially full-open, and the exhaust passage opening ratio $\theta_e$ becomes about 100%, so that the spark ignition type two-cycle engine 1 is operated in the normal combustion operational status.

In the normal combustion operational area in which the engine speed $N_e$ is large, when abnormal combustion is generated and is detected by the load cell 39, the exhaust control valve 23 is closed by control of the CPU 40 and the exhaust opening ratio $\theta_e$ is reduced and at the same time the ignition timing $\theta_{ig}$ of the ignition plug 22 is delayed, thus making it possible to avoid the abnormal combustion.

In the status where the AR combustion operation is performed in a low load operational area in which the engine speed $N_e$ is small and particularly the throttle valve opening $\theta_{th}$ is small, when abnormal combustion is generated, the exhaust control valve 23 is opened by control of the CPU 40, unlike the normal combustion operational area, so that the exhaust opening ratio $\theta_e$ is increased and at the same time the ignition timing $\theta_{ig}$ of the ignition plug 22 is advanced, thus making it possible to prevent the abnormal combustion. In addition, the same is true for the transient operational area.

In a normal combustion operational status in which the engine speed $N_e$ is further large, the exhaust control valve 23 is rocked downward along with a decrease in the engine speed $N_e$ to restrict the exhaust port 18, and thereby the exhaust passage opening ratio $\theta_e$ is lowered, so that the fresh mixture in the combustion chamber 21 is self-fired with the firing timing most desirable for operation of an engine, thus leading to the AR combustion status.

As the throttle valve opening ratio $\theta_{th}$ of the throttle valve 12 is reduced, particularly in a low speed rotational area, the exhaust port 18 is restricted by the downward rocking of the exhaust control valve 23 and the exhaust passage opening ratio $\theta_e$ is reduced; however, when the throttle valve opening ratio $\theta_{th}$ of the throttle valve 12 is reduced to be less than the value $\theta_{th3}$, the exhaust passage opening ratio $\theta_e$ is abruptly reduced and is then abruptly increased after the throttle valve opening ratio $\theta_{th}$ becomes the value $\theta_{th2}$. THUS, the exhaust passage opening ratio $\theta_e$ becomes a high level within the range of the throttle valve opening ratio $\theta_{th}$ being from $\theta_{th1}$ to $\theta_{th0}$, so that the combustion status is returned from the AR combustion status to the normal combustion status, leading to the abrupt reduction in the output of the spark ignition type two-cycle engine 1, thus abruptly decelerating the spark ignition type two-cycle engine 1.

In this way, by restricting the throttle valve 12 up to the minimum opening ratio, an engine brake is operated, and the motorcycle is abruptly decelerated, to be stopped.

In the embodiment having the carburetor 11, by adjustment of the exhaust opening ratio $\theta_e$ and the ignition timing $\theta_{ig}$, abnormal combustion can be avoided. However, in a fuel injection type two-cycle engine, there may be added a function of adjusting a fuel injection amount from a fuel injection valve for changing an air-fuel ratio to be out of the theoretical value upon abnormal combustion, which can further prevent the abnormal combustion.

In the embodiment shown in FIGS. 1 to 4, the load cell 39 is used to detect abnormal combustion. However it may be replaced by a G sensor 42, indicator sensor 43, or a load cell 44 of plug/gasket type.

Incidentally, even when the engine speed $N_e$ and the throttle valve opening ratio $\theta_{th}$ are correspondingly set, a compression start pressure in the cylinder is often varied due to a change in air temperature, atmospheric pressure caused by a difference in altitude. To solve this problem, an exhaust gas temperature sensor 41 may be provided in the exhaust passage 20. In this case, the CPU 40 compares a reference exhaust gas temperature determined by the engine speed $N_e$ and th throttle valve opening ratio $\theta_{th}$ in a temperature correction table shown in Table 1, with an exhaust gas temperature detected by the exhaust gas temperature sensor 41. For example, when the difference therebetween is more than 50° C., specifically, when the exhaust gas temperature detected by the exhaust gas temperature sensor 41 is lower than the reference exhaust gas temperature, the exhaust opening ratio $\theta_e$ of the exhaust control valve 23 is increased. When the detected exhaust gas temperature is higher than the reference exhaust gas temperature, the exhaust opening ratio $\theta_e$ of the exhaust control valve 23 is reduced.

TABLE 1

Correcting Table for Exhaust Gas Temperature

| Uth | Ne | | | |
|---|---|---|---|---|
|  | 2000 | 3000 | 5000 | 8000 |
| 10 | 200 | 225 | 230 | 250 |
| 20 | 310 | 340 | 420 | 530 |
| 30 | 500 | 520 | ... | ... |
| 50 | 600 | ... | ... | ... |
| 100 | 800 | ... | ... | ... |

In the case where a cooling water temperature detected by the water temperature gauge 36 is less than 20° C., the reference exhaust gas temperature in Table 1 may be corrected as shown in Table 2. Moreover, in place of the cooling water temperature detected by the water temperature gauge 36, the seating temperature of the ignition plug 22 may be detected, and on the basis of the measured value, the reference exhaust gas temperature in Table 1 may be corrected.

TABLE 2

Correcting Table for Water Temperature

| Tw | 10° C. | 0° C. | 10° C. | 20° C. | 20° C. or more |
|---|---|---|---|---|---|
| Tg' | +50 | +30 | +10 | 0 | 0 |

Figure 5:
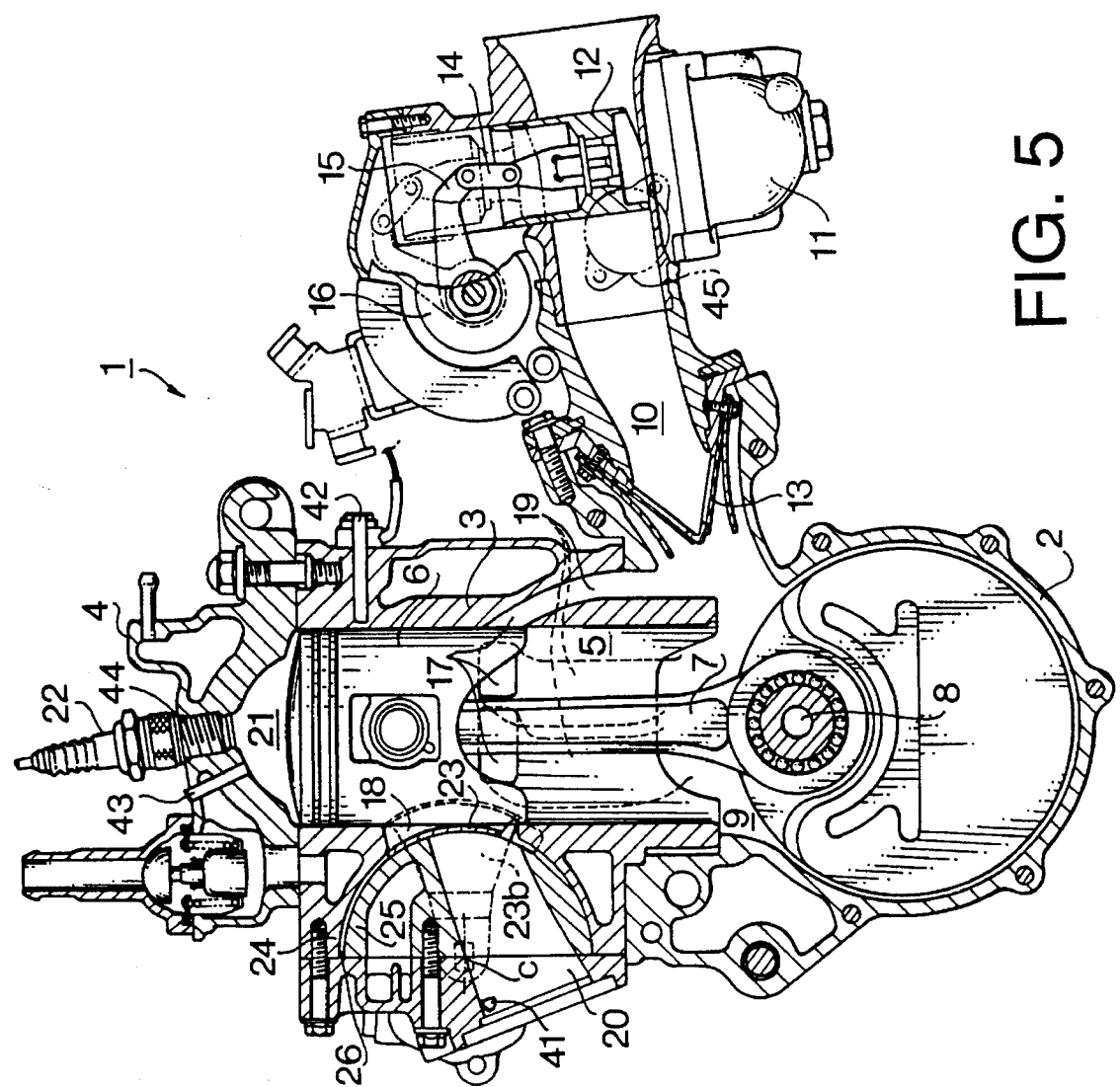
FIG. 5 is a schematic view of another embodiment.
Figure 8:
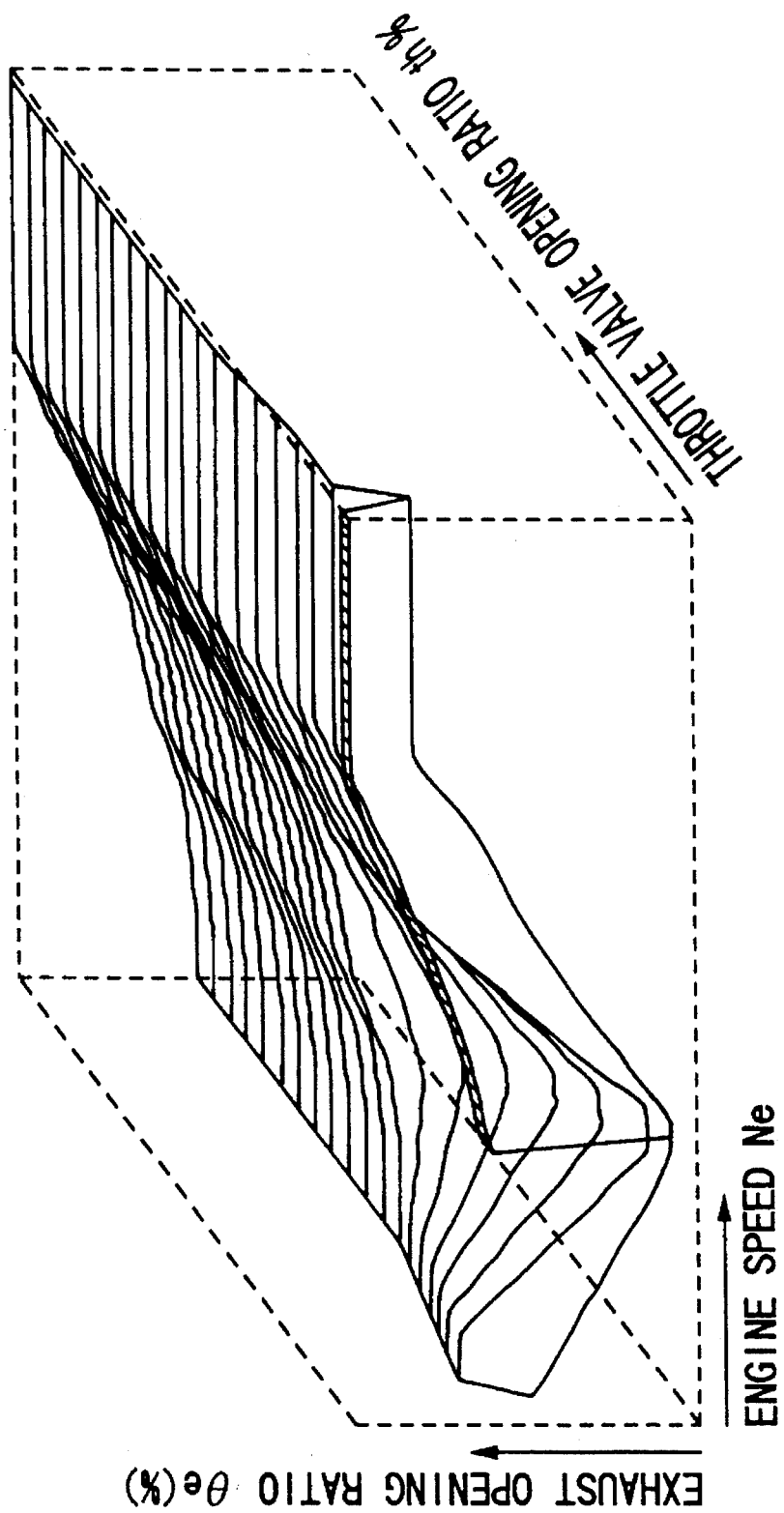
FIG. 8 is a diagram showing a control map of a further embodiment.
Figure 9:
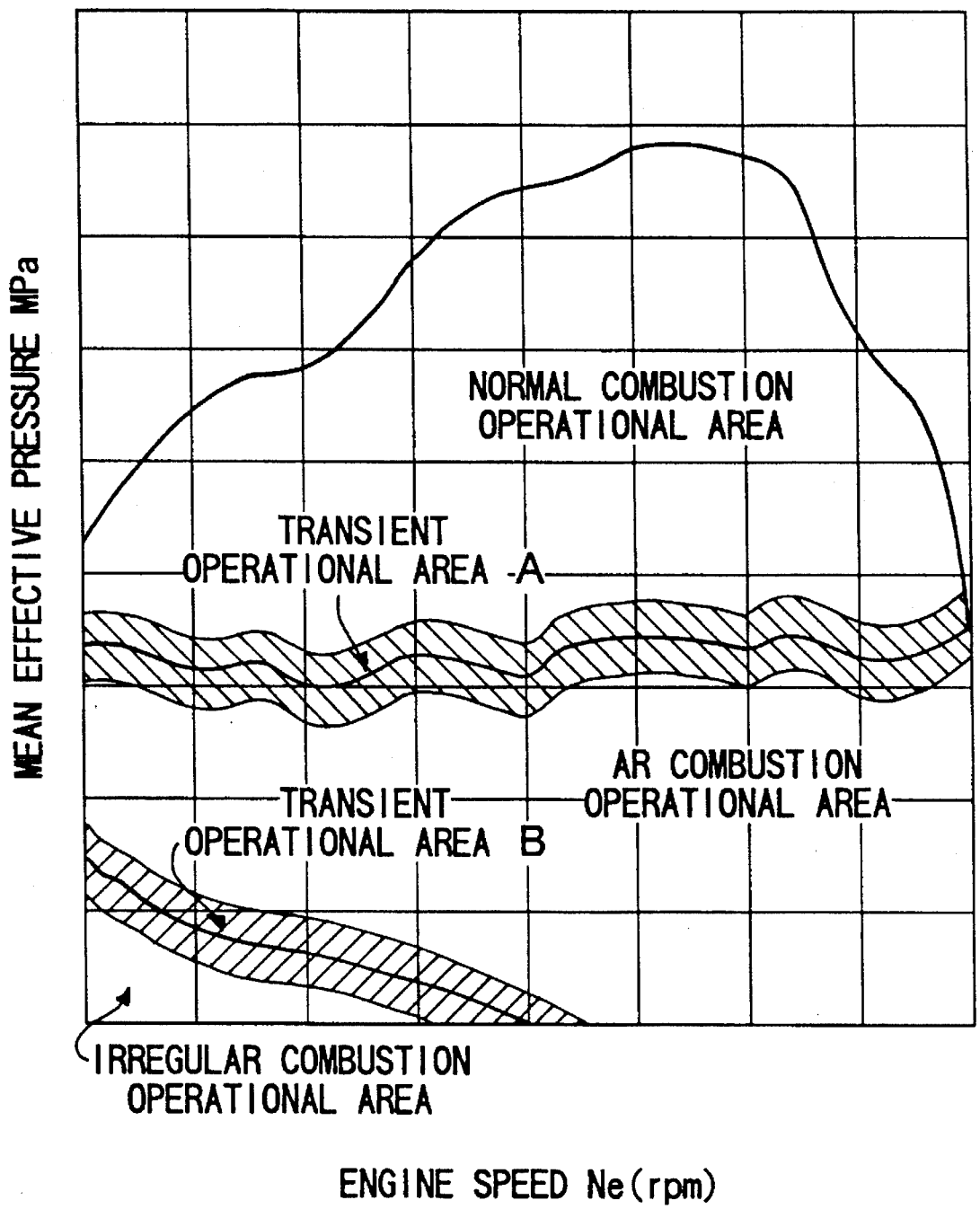
FIG. 9 is a characteristic view showing an operational status of an engine in which the abscissa indicates the engine speed and the ordinate indicates the mean effective pressure.
Figure 10:
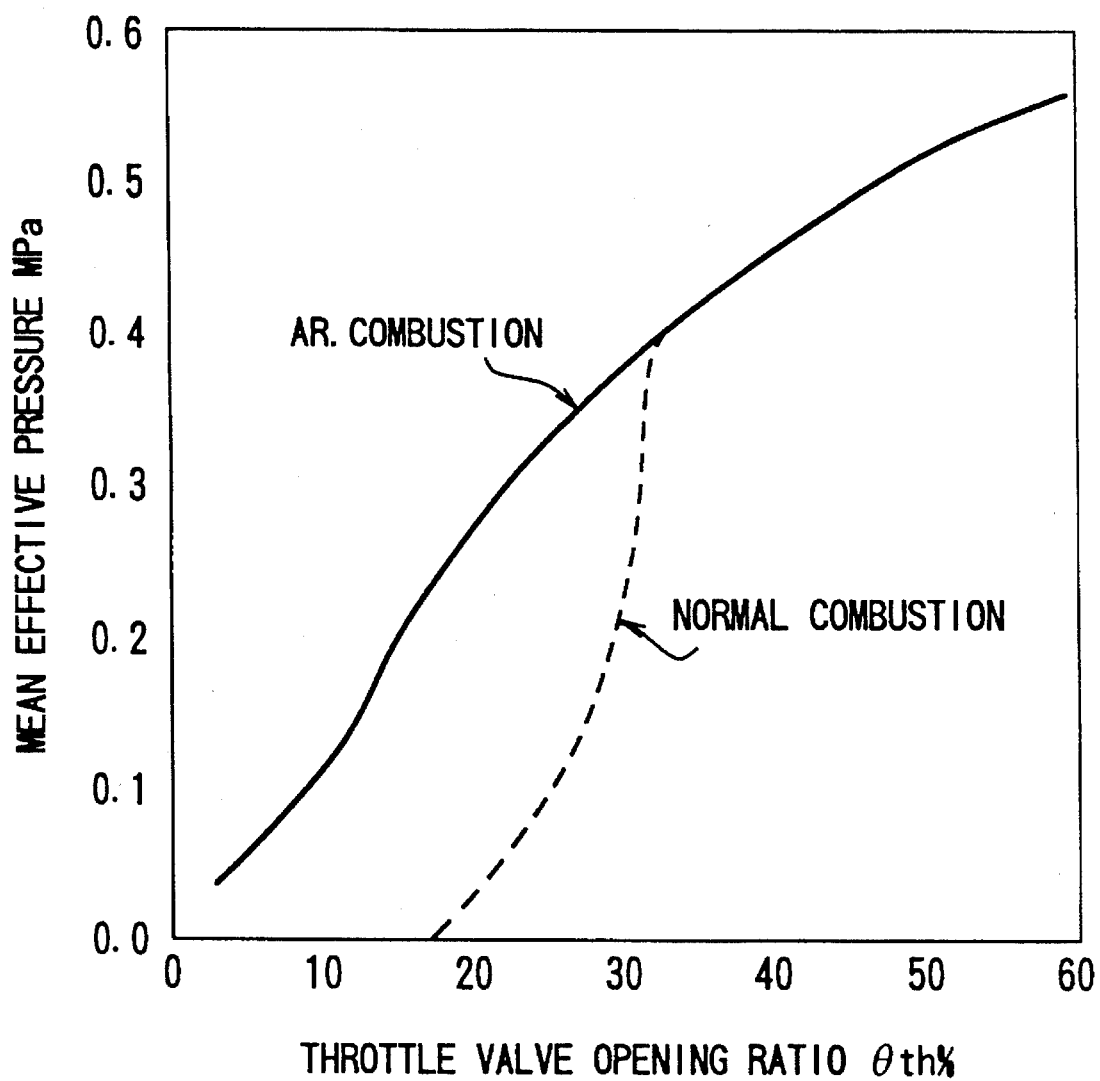
FIG. 10 is a characteristic view showing the relationship between the throttle valve opening ratio and the mean effective pressure in a normal combustion operational status and an AR combustion operational status, in a spark ignition type two-cycle engine.

In the embodiment shown in FIGS. 1 to 4, a map is used as shown in FIG. 5. However, a map as shown in FIG. 8 may be used.

In the case where the engine speed $N_e$ is a specified value or less, the output of the engine is reduced, which reduces the necessity of abruptly increasing the exhaust passage opening ratio $\theta_e$, so that in the map in FIG. 6, the exhaust passage opening ratio $\theta_e$ is left as being low in this area, but the deceleration can be kept in a medium/high rotational area.

In the previous embodiment, the exhaust control valve is used as exhaust passage opening ratio adjusting means. However, a butterfly valve may be used as the exhaust passage opening ratio adjusting means in the exhaust passage 20.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A combustion controller for an internal combustion spark ignition type two-cycle engine, said engine including an exhaust passage opening ratio adjusting means for adjusting an exhaust passage opening ratio, wherein said exhaust passage opening ratio adjusting means is driven to adjust the exhaust passage opening ratio at a value corresponding to an engine speed and a throttle valve opening ratio at least in a low load operational area, whereby fresh mixture in said combustion engine is self-fired with a firing timing desirable for operation of the engine, said combustion controller comprising:

ignition timing adjusting means for adjusting an ignition timing;

abnormal combustion detecting means for detecting abnormal combustion in said combustion chamber; and control means for controlling the exhaust passage opening ratio and the ignition timing at respective values suitable for eliminating the abnormal combustion on the basis of the detection signal from said abnormal combustion detecting means.

2. A combustion controller for a spark ignition type two-cycle engine according to claim 1, wherein in the case where abnormal combustion is detected by said abnormal combustion detecting means in a normal combustion operational area, said controlling means reduces the exhaust passage opening ratio and delays the ignition timing; and in the case where abnormal combustion is detected by said abnormal combustion detecting means in an AR combustion area, said controlling means increases the exhaust passage opening ratio, and advances the ignition timing.

3. A combustion controller for a spark ignition type two-cycle engine according to claim 1, wherein said abnormal combustion engine detecting means comprises a load cell additionally provided on a bolt for connecting a cylinder block with a cylinder head or a load cell of plug/gasket type.

4. A combustion controller for a spark ignition type two-cycle engine according to claim 1, wherein said abnormal combustion detecting means comprises a G sensor for detecting acceleration or an indicator sensor for detecting a pressure in the combustion chamber.

5. A combustion controller for an internal combustion spark ignition type two-cycle engine capable of self-firing fresh mixture in a combustion chamber at least in a low load operational area, said combustion controller comprising:

exhaust passage opening ratio adjusting means for adjusting an exhaust passage opening ratio for controlling a compression start pressure in a cylinder; and controlling means for driving said exhaust passage opening ratio adjusting means and adjusting the exhaust passage opening ratio at a value at least corresponding to an engine speed and a throttle valve opening ratio, thereby controlling the compression start pressure in a cylinder to be a target value capable of self-firing fresh mixture in the combustion chamber with a timing desirable for operation of the engine;

wherein the exhaust passage opening ratio in the width of the throttle valve opening ratio ranging from the minimum value to a specified value is set to be larger than the exhaust passage opening ratio at the throttle valve opening ratio near said minimum throttle valve opening ratio.

* * * * *